Nov. 5, 1968  M. R. RADCLIFFE ETAL  3,409,174
URETHANE MIXERS AND DISPENSERS
Filed Sept. 1, 1966  5 Sheets-Sheet 4

United States Patent Office 3,409,174
Patented Nov. 5, 1968

3,409,174
URETHANE MIXERS AND DISPENSERS
Milton R. Radcliffe, Marblehead, Robert C. Simmonds, Jr., Topsfield, and Andrew J. Gilbride, Swampscott, Mass., assignors to United Shoe Machinery Corporation, Flemington, N.J., a corporation of New Jersey
Filed Sept. 1, 1966, Ser. No. 576,686
20 Claims. (Cl. 222—70)

This invention relates to mixing and dispensing apparatus and is directed more particularly to a machine for mixing and dispensing multiple components, such as those used in the forming of polyurethanes or other materials.

Mixing apparatus known in the art generally includes separate conduits for a curable liquid reactant and a liquid curing agent reactive with the first liquid to form a cured product which may also be cellular or expanded, each of the conduits having a separate discharge opening communicating with a mixing chamber. The apparatus also includes means to control the flow of the two liquids into the chamber, and to control the operation of a mixing member disposed within the mixing chamber. This mixture in a highly viscous, yet still liquid form, is then injected into a suitable mold in which the mixture, such as polyurethane, is molded to form shaped bodies and allowed to harden.

Some difficulty has been experienced in intermittent operation because solidification of the reactants, or mix components, remaining in the mixing chamber and discharge nozzle areas occurs causing clogging of the apparatus. In such procedures many operators resort to as near a continuous operation as possible to prevent the mixture from curing and hardening within the apparatus. Such an operation is usually wasteful and uneconomical since the constituent materials are sometimes discharged unnecessarily.

As an alternative procedure, the apparatus is operated cyclically and must be drained and extensively and thoroughly cleaned of all residual portions of the mixture after each cycle of mixing and discharging. Cleaning is required so that the apparatus can function properly during successive mixing and discharging cycles. Such cleaning operations are time consuming, tedious, require an excessive amount of solvent material and represent an increased cost of the finished product.

Another principal defect in devices of this type is an inability to measure consistently accurate amounts of liquids which are to be mixed. It is important that the mixing operation be carried out with precision and uniformity as well as rapidity.

It is, therefore, an object of this invention to provide improved apparatus for mixing liquids which will react to form a cured material.

Another object of the invention is to provide apparatus which will effect mixing of components which are measured consistently and accurately.

Still another object of the invention is to provide apparatus which will effect substantially instantaneous mixing of the components of a polyurethane plastic and which can be used intermittently without cleaning the mixing chamber and nozzle areas of the apparatus each time it is stopped.

With the above and other objects in view, as will hereinafter appear, the present invention in one aspect thereof contemplates a mixing chamber for receiving reactants, a high speed agitator at one end of the chamber for mixing the reactants, ports at the same end of the chamber for admitting the reactants into the chamber, a discharge nozzle also at the same end of the chamber for extruding the mixture, and piston means in the chamber for forcing the mixture out through the discharge nozzle as soon as it is thoroughly mixed.

In accordance with a further feature of the invention there is incorporated in the machine means for admitting a preselected quantity of first one reactant and then a preselected quantity of another reactant, mixing them very rapidly, and automatically and quickly injecting the mixture into a mold assembly.

A further feature of the invention comprises means for varying the quantities or ratio of reactants mixed without machine shutdown.

A still further feature of the invention comprises means for admitting one reactant to said chamber immediately after dispensing of a batch of mixture, the one reactant serving to dilute the residue of the mixture left in the chamber whereby to prevent its hardening and clogging the mixing chamber. In addition, this feature permits stoppage of the operation of the machine and subsequent starting without a cleaning operation.

Still another feature of the invention comprises means for lubricating certain critical areas of the mixing chamber and nozzle whereby to prevent the accumulation of mix in those areas.

Another feature of the invention comprises means operable between mix dispensing operations for blowing away any mix which might have accumulated in the discharge nozzle despite the above-mentioned lubrication provision.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

Reference is made to the accompanying drawings in which there is shown an illustrative embodiment of the invention from which its novel features and advantages will be apparent.

Figure 1:
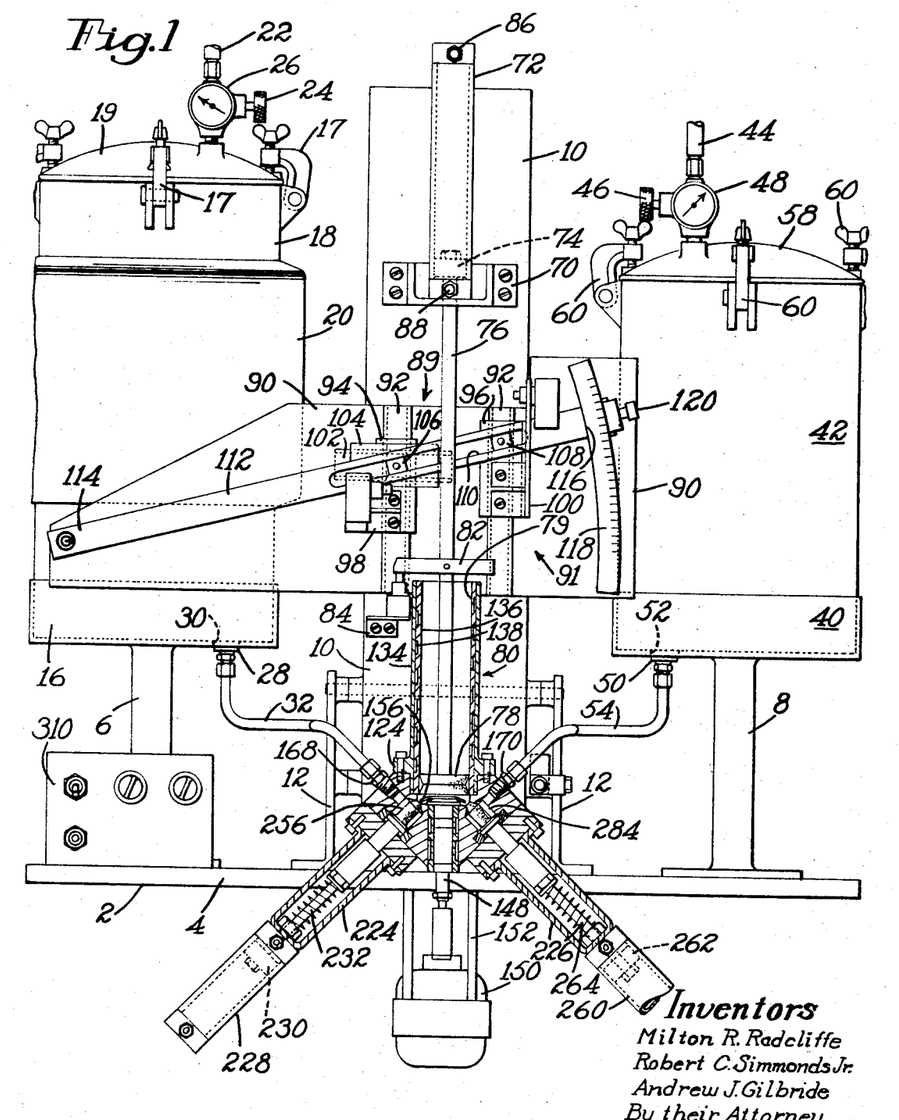
FIG. 1 is a front elevational view, partly in section, and with some parts omitted for clarity, of one form of mixer and dispenser embodying the invention.

Referring to FIG. 1, it may be seen that the illustrative machine includes a frame 2 comprising a table 4, upright supports 6, 8 and a support panel 10 connected to the table 4 by means of a pair of brackets 12. The upright support 6 has fixedly disposed on its upper end a receptacle 16 which receives a tank 18 serving as a reservoir for one of the reactants or components of the mixture to be made and dispensed, such as, for example, a curable component, which component will hereinafter be referred to as "component A." The component A tank 18 is provided with a set of clamps 17 which permit the securing and removal of a top member 19. The tank 18 may further be provided with a jacket 20 for containing temperature control means, such as fluid or electrical coils. The component A tank 18 is maintained under pressure by a pressurized gas entering the tank from a source not shown, through a pressure line 22 which may be provided with hand control means 24 and a pressure gauge 26. A discharge spout 28 on the tank 18 protrudes through a hole 30 in the receptacle 16. Connected to the spout 28 is a component A discharge line 32 interconnecting the tank 18 with mixing chamber inlet valve means which will be described hereinbelow. The pressure in the tank 18 constantly urges the component A into the discharge line 32.

The upright support 8 has fixedly disposed on its upper end a receptacle 40 which receives a tank 42 which serves as a reservoir for a second component of the mixture to be made and dispensed, such as, for example, a hardening agent, which component will hereinafter be referred to as "component B." The component B tank 42 may be provided with temperature control means (not shown on tank 42) similar to that provided for the component A tank 18. The component B tank is maintained under pressure by a pressurized gas entering the tank from a source not shown, through a pressure line 44 which may be provided with hand control means 46 and a pressure gauge 48. A discharge spout 50 located on the lower end of the tank 42 protrudes through a hole 52 in the receptacle 40. Connected to the spout 50 is a component B discharge line 54 which interconnects the component B tank 42 with the mixing means. The tank 42 is provided further with a removable cover 58 to facilitate filling of the tank with component B. A set of clamps 60 effect a hermetic seal between the tank top 58 and the tank 42 as do the clamps 17 on the tank 18.

The support panel 10 has attached thereto a bracket 70 which supports an injection cylinder 72 in which there is disposed a piston 74 connected to one end of a piston rod 76. On the other end of the rod 76 there is fixed a mixing chamber piston 78 which slidingly engages the inside wall 79 of a mixing chamber 80. The piston 78 may be of a rubberlike material for affording a close fit with the wall 79 of the chamber 80. Also attached to the rod 76 is a switch actuator bar 82 which is engageable with an injection stop switch V1A connected to the support panel 10 by means of a bracket 84. The bar 82 is also engageable with other switches hereinafter to be described.

The cylinder 72 is provided with air lines 86, 88, the line 86 being connected to a source of air under pressure which is not shown, to cause movement of the piston 74 and thereby the mixing chamber piston 78 and the actuator bar 82. Such movement of the piston 78 causes substantial emptying of the mixture in the mixing chamber, as will be further described hereinbelow.

Also attached to the support panel 10 is a face plate 90 which supports mixture ratio control means designated generally as 89 (FIGS. 1, 2, 6, 7), and batch volume control means, designated generally as 91 (FIGS. 1 and 7), for the respective purposes of changing the ratio of component A to component B in the mixture and for changing the volume of a batch of mixture while maintaining the ratio constant. Attached to the face plate 90 are a pair of T-shaped runners 92. Slidably mounted on the runners 92 are slide members 94, 96 which are movable along the runners 92 in directions parallel to the axis of the injection cylinder piston rod 76. Fixed to the slide member 94 by a bracket 98, is a component A level switch V2A which lies in the path of movement of the actuator bar 82 and is engageable by the actuator bar for purposes to be described below. Fixed to the slide member 96 by a bracket 100 is a spring biased component B level switch V3 which also lies in the path of movement of the actuator bar 82 and is operable thereby for purposes to be described below. Thus, the positions of the switches V2A, V3 may be altered by moving the slide members 94, 96 on their respective runners 92.

Figures 6, 7:
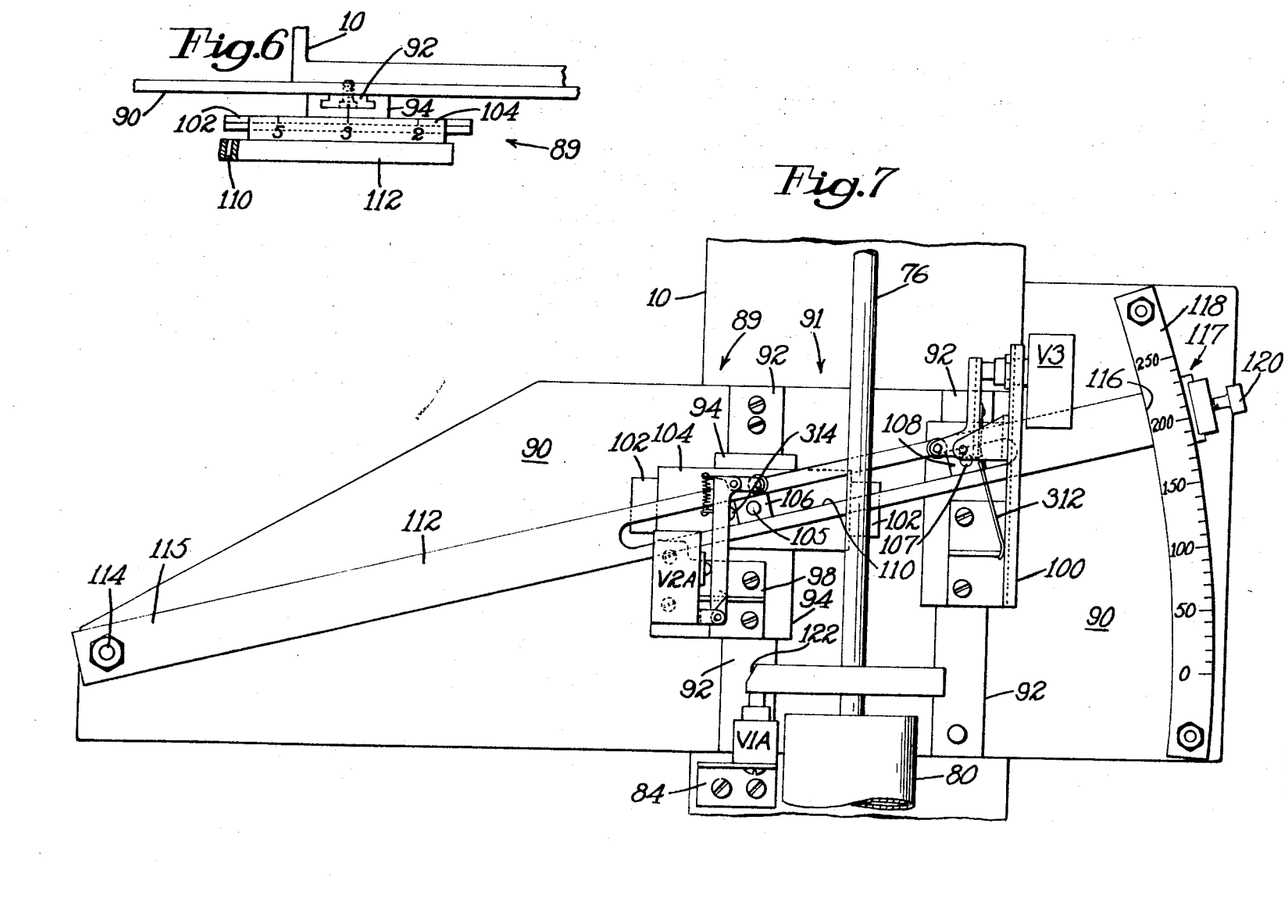
FIG. 6 is a detailed plan view of a component ratio changing means.
FIG. 7 is a detailed front elevational view of the component ratio changing means and the batch volume changing means.

Connected to the slide member 94, see FIG. 6, is a T-shaped runner 102 having a slide member 104 fitted thereon and movable in directions transverse to the directions in which the slide members 94, 96 are movable. Pivotally attached to the slide member 104, by a pivot pin 105, is a slide block 106 and pivotally attached to the slide member 96, by a pivot pin 107, is another slide block 108 (FIG. 7). The blocks 106, 108 are slidably disposed in a slot 110 extending lengthwise of a batch control bar 112 which at a point 114 near one end 115 is pivotally connected to the face plate 90. An arcuate groove 116 in the bar 112 is provided near the opposite end 117 for receiving an arcuate bar 118 which is anchored to the face plate 90 and which is shown graduated in cubic centimeters relating to the volume of mixture admitted to the mixing chamber during a cycle of operation. A manually operated clamp member 120 is provided on the end 117 of the batch control bar 112 for holding the batch control bar in a selected position on the arcuate bar 118. It will be apparent that by loosening the clamp member 120 the batch control bar 112 may be pivotally moved with the groove 116 moving along the arcuate bar 118. The blocks 106, 108 are moved accordingly, causing movement of the slide members 94, 96 and consequent movement of the component A level switch V2A and the component B level switch V3 so as to alter their positions in the path of travel of the actuator bar 82, thereby varying the point in a cycle of operation at which the switches V2A, V3 will be actuated. Varying the positions of the switches V2A and V3 in such manner in the path of travel of the bar 82 operates to change the quantity of each component allowed in the mixing chamber without varying the ratio of component A to component B. The ratio of A to B is constant, being a function of the distance from the pivot point 114 to the points 105 and 107 respectively.

The ratio of component A to component B may be changed, however, by moving the slide member 104 relative to the slide member 94. The slide member 104 may be provided with a scale indicating the ratio of component A to component B (FIG. 6). Movement of the slide member 104 moves the block 106 in the slot 110, causing movement of the slide member 94 on the runner 92 and thereby movement of the component A level switch V2A in a direction parallel to the axis of the rod 76, changing the time in a cycle in which the component A level switch V2A is engaged by a cam surface 122 on one end of the bar 82. The operation of the ratio and batch volume control means will be further described hereinbelow.

A block 130 having a recess 132 for forming the bottom portion of the mixing chamber 80 is mounted on the frame 2 and retains mixing chamber inlet valve means for components A and B and also mixing chamber agitator means. The mixing chamber 80 comprises a cylinder having an outer sleeve 134 (FIG. 4) and an inner sleeve 136. The outer sleeve 134 includes an annular flange portion 124 which is connected to the block 130 as by screws 126. The inner sleeve is provided with a helical grove 138 having an inlet 140 and an outlet 142, both of which extend through the outer sleeve 134 and communicate with a supply of cooling fluid (not shown) and a discharge reservoir or recirculating unit (not shown), respectively, for the purpose of maintaining the mixing chamber at a desired temperature.

The block 130 is provided with a bore 144 in line with and in communication with the recess 132 for the purpose of retaining the mixing chamber agitating means. The bore 144 receives a bearing 146 in which is mounted a shaft 148 rotatable at high speed by an electric motor 150 (FIG. 1) held by a bracket 152 to the under-side of the table 4. The end of the shaft 148 remote from the motor 150 is provided with a head 154 (FIG. 4) on which is secured a mixing member 156 disposed in an enlarged portion 157 of the bore 144. The bearing 146 is reduced in outside diameter throughout two portions of its length to form a pair of annular grooves 158, 159 (FIGS. 2, 4) which communicate with inlets 160, 162 respectively (FIG. 2) in the block 130. The inlet 160 is connected to a cooling fluid system which is not shown, but which affords a cooling medium, such as water, for circulation about the bearing 146. An outlet 163 returns the cooling medium to its source for recirculation or to discharge means. The inlet 162 is connected to a lubricating oil system which provides oil under pressure to the groove 159 and through a hole 161, or a series of such holes, to the shaft 148. The oil finds its way between the shaft 148 and the bearing 146 to enter the mixing chamber 80 by flowing between the head 154 of the mixing member 156 and the bearing 146. Such flow not only lubricates the shaft 148 in the bearing 146 and the head 154 on one end of the bearing 146 but also serves to lubricate and "flush" the area of the mixing chamber 80 under the mixing member 156 where mix might otherwise tend to accumulate. Cooling water is supplied through the inlet 160 continuously while the lubricating oil is supplied through the inlet 162 in a particular sequence in the cycle of operation of the apparatus, as will be fully explained below. It will be appreciated that the flow of oil into the mixing chamber is not in quantities sufficient to alter to any appreciable degree the character of the mix.

Means, not shown but known in the art, may be provided for moving the shaft 148 axially while it is rotating, so as to move the mixing member further into the mixing chamber to further insure complete mixing of the components or reactants.

The block 130 is provided with bores 164, 166 (FIG. 4) which receive inlet fittings 168, 170 respectively, which, in turn, receive the component A and B discharge lines 32, 54 respectively.

The block 130 is provided with still another bore 172 (FIGS. 2 and 3) which receives a sleeve 174 which, in turn, receives a nozzle member 176 which forms the injection nozzle of the machine through which mix is dispensed during an injection operation. The sleeve 174 is provided with an annular groove 178 (FIG. 3) for receiving air under pressure from a source which is not shown and another annular groove 179 for receiving lubricating fluid under pressure from a source not shown. The sources of air and oil are in communication with the groves 178, 179, respectively, by way of conduits 180, 182, respectively. Associated with the nozzle member 176 is a sprue valve 184 in communication with a sprue channel 186 which interconnects the mixing chamber 80 and the sprue valve 184. A face plate 188 is connected to the block 130 and covers the outside face of the nozzle member 176. The nozzle member 176 is made of a porous metal material so that oil in the annular groove 179 passes through the nozzle member to lubricate its inner surface 190 immediately prior to the discharge of mix whereby to insure smooth flow of mix over the nozzle surface 190. Air in the groove 178 passes through the nozzle member 176 immediately after completion of a mix dispensing operation to blow away any matter which might have collected on the surface 190, whereby to insure a clean nozzle surface for the next dispensing operation.

For the purpose of conveying the components A and B to the mixing chamber, the block 130 is provided with bores 200, 202 (FIG. 4) which are in communication with the bores 164, 166, respectively, and also with the mixing chamber 80.

Figures 4, 5:
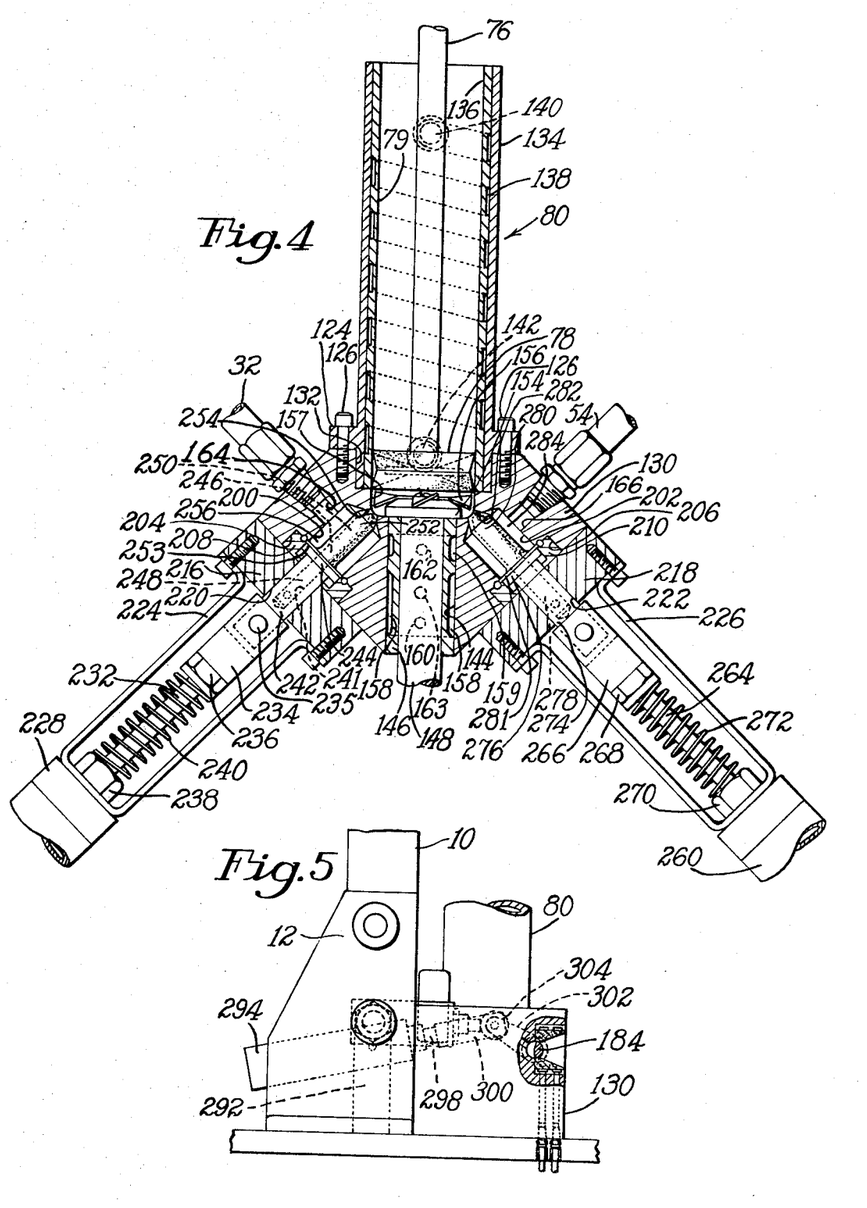
FIG. 4 is a front view in section, showing the mixing chamber and mixing chamber inlet valves in detail.
FIG. 5 is a detailed side elevational view, partly in section, showing the injection nozzle valve and injection nozzle valve operating means.

Each of the bores 200, 202 is provided with enlarged portions 204, 206, respectively, which receive fittings 208, 210, respectively. Fastened to the block 130 and covering one side of the fittings 208, 210 are blocks 216, 218 having central bores 220, 222, respectively. Attached to the blocks 216, 218 are U-shaped brackets 224, 226. To the bracket 224 there is connected a component A mixing chamber inlet valve cylinder 228 having a piston 230 (FIG. 1) connected to a pison rod 232. To the free end of the piston rod 232 there is fixed a sleeve member 234 (FIG. 4). A nut 236 is mounted on the rod 232 adjacent the member 234. Another nut 238 is mounted on the closed end of the U-shaped bracket 224 and about the rod 232. A coil spring 240 is disposed about the rod 232 and between the nuts 236, 238, whereby to urge the piston rod 232 in a direction away from the component A inlet valve cylinder 228. Received in the free end of the member 234 and retained there by a connecting pin 235, is a cylindrically shaped link 242 having a collar 244. A valve member 246 has an anchored portion 248 retained in a bore 241 of the link 242, and a portion 250 which is covered with a rubber or rubber-like sheath 252 which has an annular flange portion 253 held between the fitting 208 and the block 130, as may be seen in FIG. 4. The collar 244 is engageable with the flange portion 212 of the sheath 252. The valve member 246 is urged by the action of the spring 240 into a position which closes a component A mixing chamber inlet 254 which interconnects the bore 200 and the mixing chamber 80. The bore 200, the sheath 252, and the bore 164 cooperate to comprise a component A mixing chamber inlet valve chamber 256 which is filled with component A under pressure because of the pressure maintained in the component A storage tank 18. The spring 240 exerts a pressure greater than that maintained on the component A tank 18, discharge line 32, and chamber 256. The rubbery sheath 252 maintains an effective seal with the inlet 254 to prevent undesired leakage into the mixing chamber. The sheath 252 also effectively seals off the component A mixing chamber inlet valve chamber 256 from the component A inlet valve operating means. It is apparent that when the component A mixing chamber inlet valve cylinder 228 operates to draw in its piston rod 232 against the pressure of the spring 240 the valve member 246 is moved a distance allowable by the length of travel permitted the collar 244 by the fitting 208 thereby to move the valve member 246 away from the inlet 254. The rubberlike sheath 252 collapses under the pressure of the component A whereby to move from an obstructing position in the component A inlet 254 to permit the component A in the valve chamber 256 to enter the mixing chamber 80.

In like manner, to the bracket 226 there is connected a component B mixing chamber inlet valve cylinder 260 having a piston 262 (FIG. 1) connected to a piston rod 264. To the free end of the piston rod 264 there is fixed a sleeve member 266. A pair of nuts 268, 270 are mounted similarly to the nuts 236, 238 and retain therebetween a coil spring 272. Connected to the member 266 is a link 274 having a collar 276 and a bore 277 which receives a valve member 278. A portion of the valve member 278 receives a sheath 280 of rubberlike material having an annular flange portion 281 held between the fitting 210 and the block 130. The valve member 278 is urged by the spring 272 to a position closing off a component B mixing chamber inlet 182 which interconnects the mixing chamber 80 and a component B inlet valve chamber 284 formed by the bores 166 and 202, and the sheath 280. As in the component A valve chamber 256, the component B valve chamber 284 is filled with component B under pressure because of the pressure maintained in the component B storage tank 42. The spring 272, however, exerts a pressure greater than that maintained on the component B tank 42, discharge line 54, and valve chamber 256. When the component B mixing chamber inlet valve cylinder 260 operates to draw in its piston rod 264 against the pressure of the spring 272, the valve member 278 is moved a distance allowable by the length of travel permitted the collar 276 by the fitting 210, thereby to move the valve member 278 away from the inlet 282. The sheath 280 collapses under the pressure of the component B whereby to move from an obstructing position in the inlet 282 so as to permit the component B in the valve chamber 284 to enter the mixing chamber 80. Thus, the mixing chamber inlet valve cylinders 228, 260 operate to admit the components A and B into the mixing chamber 80 where they are immediately engaged by the mixing member 156 whereby to form a homogeneous mass preparatory to injection into a mold assembly.

Figures 2, 3:
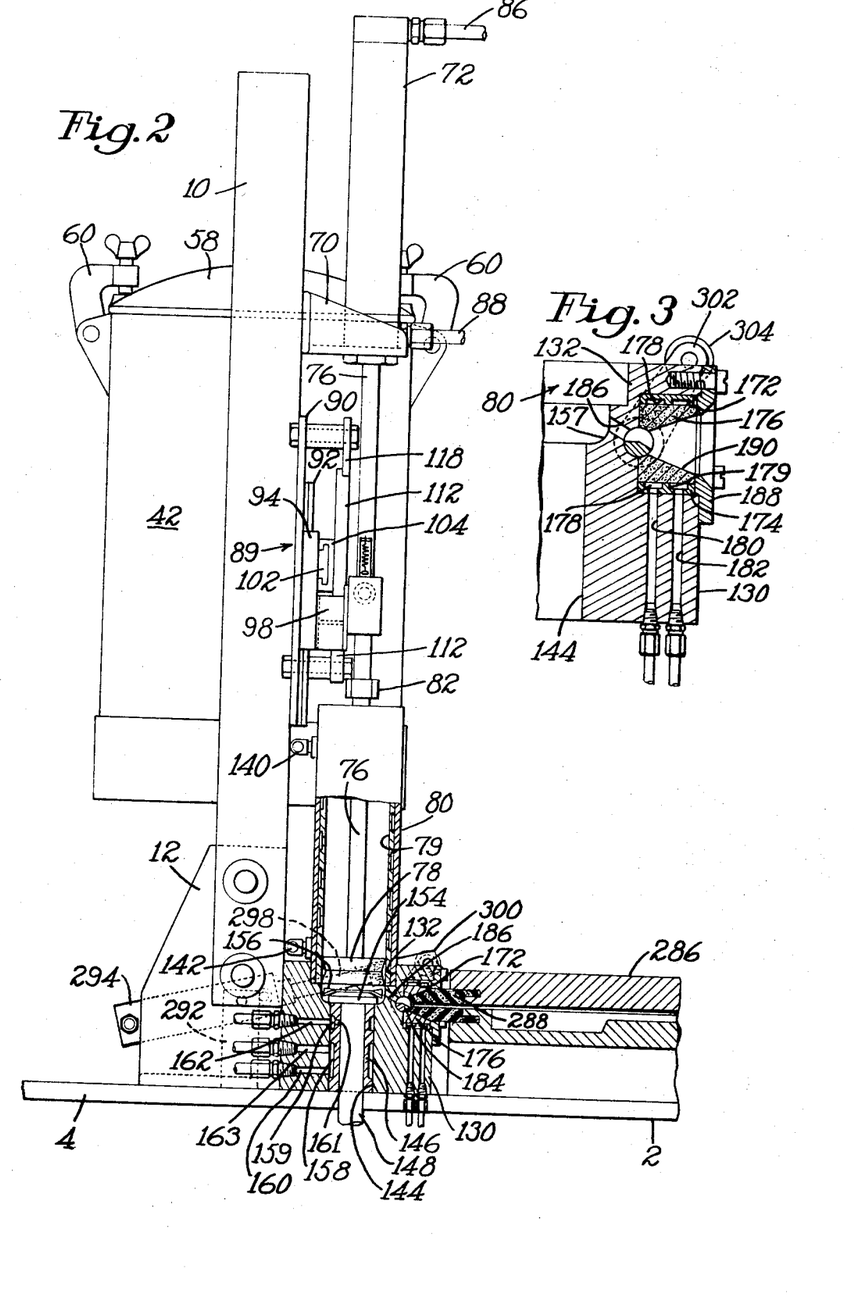
FIG. 2 is a side elevational view, partly in section, and with some structural members omitted for clarity.
FIG. 3 is a detailed sectional view of an injection nozzle structure.

Injection of the mixture into a mold assembly 286 (FIG. 2), which may be provided with a nozzle plug 288 engageable with the nozzle member 176, is facilitated by action of the sprue valve 184, the operation of which will now be described. Mounted on the frame 2 is a bracket 292 which pivotally retains a sprue valve cylinder 294 in which is located a piston 296 (shown schematically in FIG. 8) connected to a piston rod 298 (FIGS. 2 and 5) and carrying a link 300 on its free end. Pivotally mounted on the end of the link 300 remote from the cylinder 294 is a sprue valve link 302 (FIGS. 3 and 5). The other end of the sprue valve link 302 has fixed thereto the sprue valve 184. Also mounted at the connection between the links 300, 302 is a roller 304 which is engageable with a pneumatic switch V8 mounted on one of the brackets 12. It will be seen that movement of the piston rod 298 is translated by the sprue valve link 302 to rotational movement of the sprue valve 290 whereby to open or close the sprue channel 186, as may be observed in FIGS. 2, 3 and 5.

The operation of the machine will now be described. It will be assumed, for the purposes of illustration, that the tanks 20, 42 have been provided with the components A and B, respectively, to be mixed and dispensed into the mold assembly 286. The mixing chamber 80 has disposed therein a quantity of the component A sufficient for a batch of mixture. The mixing chamber piston 78 is in a raised position with the actuating bar 82 having engaged the component A level switch V2A, to shift it to the cam position (FIG. 8), but not the component B level switch V3. A manual component A switch V1 is in the open position. The various temperature control and lubricating circuits are connected to their respective sources, as are the storage tank pressure lines 22, 44. The inlet valve chambers 256, 284 are filled with the respective mix components. The ratio setting means 89 and batch volume setting means 91 are locked in preselected positions according to the ratio and volume desired for the particular operation. The motor 150 has been energized, as by an electrical switch E1 (FIG. 1), and the mixing member 156 is turning at a high rate of speed. For convenience of operation the manual component A switch V1 and the mixer electric motor switch E1 may be mounted on a control panel 310 fixed to the frame 2 of the apparatus (FIG. 1).

To start a cycle of operation, the operator manually shifts a manual component B switch V2 which is mounted on the control panel 310. Air from a main air line L (FIG. 8) passes through the switches V2A, V2 to shift a component B cylinder control valve V5. Shifting of the component B cylinder control valve V5 sends air to the rod end of the component B mixing chamber inlet valve cylinder 260, causing the rod 264 to be drawn into the cylinder 260 whereby to move the valve member 278 out of an obstructing position in the component B mixing chamber inlet 282. As long as the component B mixing chamber inlet valve cylinder 260 retains the rod 264 in such position, the sheath 280 remains in a collapsed condition and the component B flows into the mixing chamber 80. Immediately upon entering the mixing chamber, the component B encounters the high speed mixing chamber 156 and is blended with the component A already in the mixing chamber. The introduction of component B in the mixing chamber forces the mixing chamber piston 78 in a direction toward the open end of the mixing chamber sleeve 136, causing the actuator bar 82 to move a like distance in the same direction until the bar 82 engages the component B level switch V3, causing the switch V3 to shift to the cam position against the pressure of a leaf spring 312 (FIG. 7).

Upon shifting of the component B level switch V3, air from the line L passes through a check valve C1 (FIG. 8) to shift the component B cylinder control valve V5 back to a position which exhausts the rod end of the component B mixing chamber inlet valve cylinder 260 and pressurizes the head end of the cylinder 260, whereby to close the component B mixing chamber inlet 282 and shut off further flow of the component B into the mixing chamber 80.

Shifting of the component B level switch V3 also causes shifting of a sprue cylinder control valve V6 which exhausts the rod end of the sprue valve cylinder 294 and, after a brief time delay caused by a time delay mechanism T, pressurizes the head end of the sprue valve cylinder, causing the sprue valve cylinder piston rod 298 and the link 300 to move in a direction away from the cylinder 294 whereby to move the sprue valve link 302 (FIG. 5) and the sprue valve 184 to an open position (FIG. 3). The function of the time delay mechanism T is to permit sufficient mixing in the mixing chamber 80 prior to starting the injection process. If the mixing member 156 is axially movable, it is during this brief "dwell" period that the mixing member is moved well into the chamber 80 and then returned to its normal position prior to commencing of the injection operation.

Figure 8:
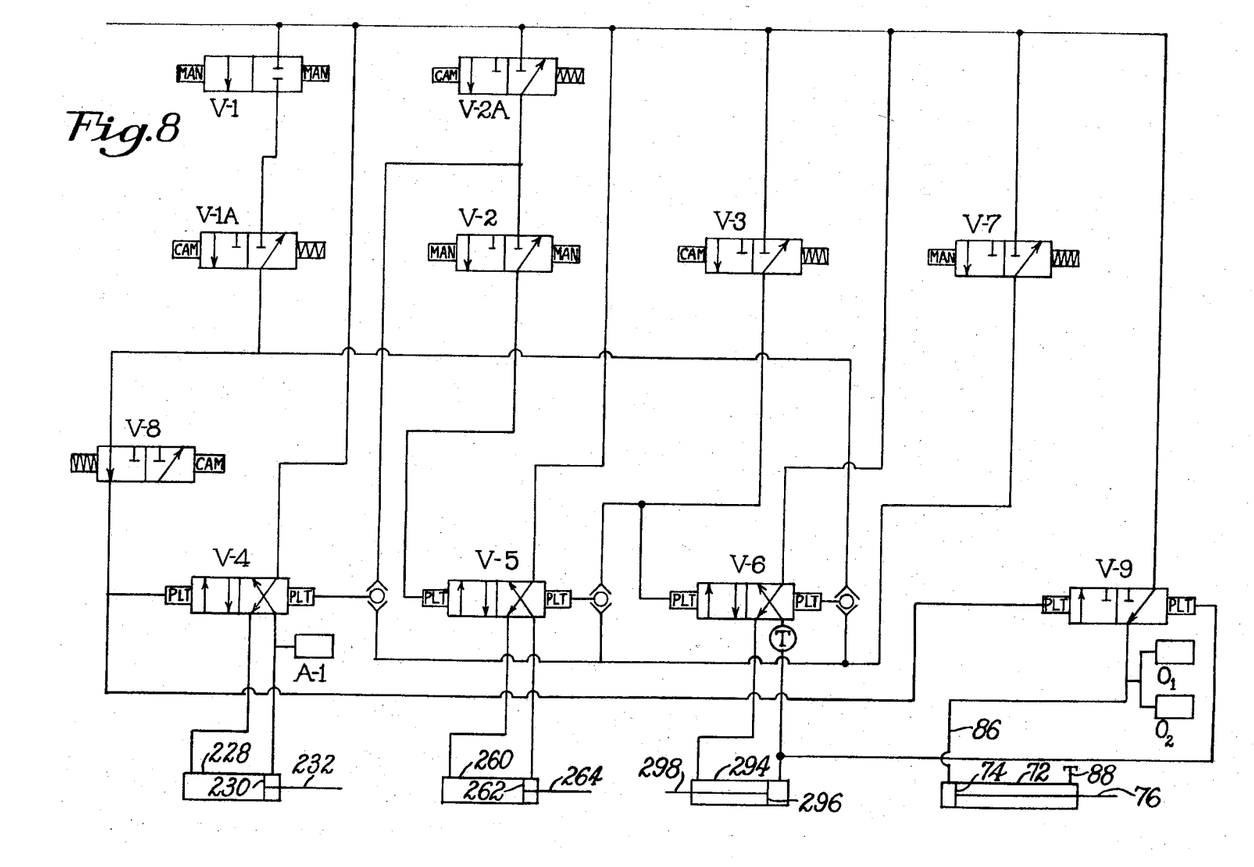
FIG. 8 is a schematic diagram illustrating the pneumatic circuit of the apparatus.

At about the same time as air is admitted to the head end of the sprue valve cylinder 294, air is also being fed to an injection cylinder control valve V9 to shift that valve to the position shown in FIG. 8. Air from the line L passes through the valve V9 to the head end of the injection cylinder 72. The rod end of the injection cylinder 72 being in communication with the atmosphere, the piston 74 is moved downwardly, the piston 78 causing flow of the mixture in the mixing chamber out the open sprue channel 186, through the mold assembly nozzle plug 288 and into the cavity of the mold assembly 286. Movement of the bar 82 downwardly permits the valve V3 to return to its spring biased position.

Air en route to the head end of the injection cylinder 72 actuates oil triggering means $O_1$ and $O_2$. The triggering means $O_1$ operates to send a charge of lubricating oil through the inlet 162 (FIG. 2) leading to the groove 159 in the outside wall of the mixer member bearing 146 and through the hole 161 to the shaft 148. Thus, the shaft 148 is well lubricated during the injection stroke of the piston 78, when the shaft is under greater operational strain. Also, during the injection stroke, oil is forced into the chamber 80 from between the bearing 146 and the head 154 to "flush" that area of the mixing chamber. The triggering means $O_2$ operates to send a charge of lubricating oil through the conduit 182 to the porous nozzle member 176 (FIG. 3), providing a lubricated inner surface 190 which insures easy flow of mixture.

At the end of the injection stroke the actuating bar 82 engages the injection stop switch V1A to shift that switch to the cam position which sends air through a check valve C2 to shift the sprue cylinder control valve V6 which exhausts the head end of the sprue valve cylinder 294 and pressurizes the rod end, whereby to cause closure of the sprue channel 186 by the sprue valve 184. As the sprue valve cylinder 294 draws in its piston rod 298 the roller 304 engages a spring biased switch V8, shifting the switch V8 to the cam position which in turn causes shifting of the injection cylinder 72. Shifting of the switch V8 also acts to shift a component A cylinder control valve V4 to exhaust the head end of the component A inlet valve cylinder 228 and pressurize the rod end of that cylinder to permit passage of the component A into the mixing chamber. Air en route from the valve V4 to the rod end of the cylinder 228 actuates an air triggering means A1. The triggering means A1 operates to send a charge of pressurized air, or other gas, through the conduit 180 to the porous nozzle member 176 (FIG. 3) to blow away from the surface 190 any material which may have collected there during the mold charging operation. As the component A rises in the mixing chamber 80, the piston 78 rises with it until the actuating bar 82, which has released the injection stop switch V1A to permit it to return to its spring biased position, engages the component A level switch V2A to shift it to the cam position. Shifting of the component A level switch V2A sends air through a check valve C3 to shift the component A cylinder control valve V4 to operate the component A inlet valve cylinder 228 to terminate flow of component A into the mixing chamber 80. Assuming the manual component B switch V2 to have been left open by the operator, air from the switch V2A shifts the component B cylinder control valve V5 to operate the component B inlet valve cylinder 260 to admit the component B into the mixing chamber, whereby another cycle of operation is well under way. Because the chamber defined by the closed end of the mixing chamber 80 and the piston 78 is always filled with liquid, air bubbles which would give rise to flaws in the molded product, are not permitted to form in the mix. If the manual component B switch V2 is closed by the operator the cycle stops with the component A in the mixing chamber and dissolving any residue of the mixture left over from the previous cycle, whereby to prevent formation of cured mixture. A reset switch V7 may be placed in the control circuit for the purpose of placing the circuit in condition for a cycle of operation after the occurrence of a malfunction which has interrupted the normal cycle as, for example, loss of pressure in the air line L during a cycle of operation.

If it is desired to alter the ratio of component A to component B, as from 3:1 to 2:1 for example, the operator closes the manual component B switch V2 to stop operation of the machine. The mixing chamber will not be fouled by the residue left there from the previous injection operation because the component A portion of the mixture automatically will enter the chamber 80 to dissolve any residue before it can cure or harden. The operator then loosens a screw 314 which locks the transverse slide member 104 to the T-shaped runner 102. The slide member 104 is then moved from the right to the left, as viewed in FIG. 6, until the number 2 is opposite the index mark on the slide member 94. Such movement of the slide member 104 causes movement of the slide block 106 in the slot 110, which movement has a vector in a direction normal to the direction of movement of the member 104, causing movement of the member 94 on the runner 92 whereby to move the position of the component A level switch V2A in the path of travel of the bar 82 and also to move the position of the switch V2A relative to the position of the component B level switch V3. In the example at hand, the switch V2A would be moved downwardly, as seen in FIG. 7, closer to the bar 82. Thus, less component A would enter the mixing chamber for a given charge and more component B would enter.

If it is desired to alter the volume of a charge without changing the ratio, the operator merely loosens the clamp 120 and moves the bar 112, using the scale on the bar 118 as a guide. Movement of the bar 112 causes movement of the blocks 106 and 108 whereby to move the component level switches V2A, V3 in the same direction, but different distances, so that the same ratio is maintained.

The above-described machine provides means for accurately measuring mixture components by volume, mixing them thoroughly and rapidly by at least two passes through a rotating mixing member, and operating intermittently while maintaining a mixing chamber and injection nozzle free of the usual hardened mix without the necessity of solvent flushing. In applications where mold assemblies are indexed into position one at a time for an injection molding operation, such intermittent mixing and dispensing is highly advantageous.

Since certain obvious changes may be made in the illustrated apparatus without departing from the scope of the invention, it is intended that all matters contained herein be interpreted in an illustrative and not a limiting sense.

Having thus described our invention what we claim as new and desire to secure by Letters Patent of the United States is:

1. Apparatus for mixing and dispensing multiple component mixtures comprising a mixing chamber having a volume variable in response to fluid entering the chamber, means for admitting a charge comprising a measured volume of one component into the mixing chamber, means for admitting a measured volume of at least one other component into the mixing chamber, means disposed in said chamber for mixing said components, means for injecting said mixture into a mold assembly, and means responsive to the operation of said injecting means for admitting another charge of said one component only into said mixing chamber in its low volume condition, said mixing means serving to mix together the last-mentioned charge and any mixture remaining in the chamber after operation of said injecting means, whereby to dilute said mixture remaining in the chamber in a greater volume of said one component, said one component serving further as a portion of a subsequent mixture, said chamber then being in a higher volume condition.

2. Apparatus for mixing and dispensing multiple component mixtures comprising a mixing chamber having a volume variable in response to fluid entering the chamber, storage means for one component of the mixture, conduit means interconnecting said storage means and said mixing chamber, first valve means operable to open said conduit to permit flow of a charge comprising a preselected volume of said one component from said storage means into said mixing chamber, at least one other storage means for at least one other component of the mixture, second conduit means interconnecting said other storage means and said mixing chamber, second valve means responsive to said flow of said one component into said mixing chamber to open said second conduit to permit flow of a preselected volume of said other component into said mixing chamber, means disposed in said mixing chamber for mixing said components, and means responsive to the flow of said other component into said mixing chamber for injecting the mixed components into a mold assembly, said first valve means being responsive to the operation of said injection means for permitting the flow of another charge of said one component only into said mixing chamber in its low volume condition, said mixing means serving to mix together the last-mentioned charge and any mixture remaining in the chamber after operation of said injecting means to dilute mixture remaining in said chamber in a greater volume of said one component, said chamber then being in a higher volume condition, and said one component serving further as a portion of a subsequent mixture.

3. Apparatus for mixing and dispensing multiple component mixtures comprising a mixing chamber, mixer means disposed near one end of said chamber for mixing a plurality of components, outlet means located in said chamber at said one end of the chamber, a plurality of inlet means located at said end of the chamber, a piston disposed in said chamber in slidable engagement with the inside walls of said chamber, first valve means for admitting a charge of one component to said chamber through one of said inlets, at least one other valve means for admitting at least one other component to said chamber through a second of said inlets, said piston being slidably movable in said chamber in a direction away from said one end of the chamber responsive to the flow of the components into said chamber, and piston driving means responsive to the movement of said piston for moving said piston toward said one end of the chamber whereby to force the mixed components through said mixer means and through said outlet means.

4. The invention according to claim 3 including means responsive to the movement of said piston toward said one end of the chamber for operating said first valve means for admitting another charge of said one component to the mixing chamber.

5. Apparatus for mixing and dispensing multiple component mixtures comprising a mixing chamber, a mixer disposed near one end of said chamber, injection means connected to a piston slidably disposed in said chamber, pressurized storage tanks for containing the respective components under pressure, mixing chamber inlets disposed at said one end of the mixing chamber, conduits interconnecting each storage tank with one of said inlets, valve means in each conduit for opening and closing the conduits, nozzle means at said end of the chamber comprising an outlet for the mixture, and sprue valve means for opening and closing said nozzle means, said valve means being operable to admit the components sequentially to the mixing chamber, the piston being movable in said chamber in a direction away from said one end of the chamber responsive to the admittance of said components, said injection means operable in response to said movement of the piston to change the direction of movement of said piston, and said sprue valve means being responsive to the first mentioned movement of the piston to open said sprue valve, whereby the movement of said piston toward said outlet and the open sprue valve cooperate to inject the mixture into a mold assembly.

6. The invention according to claim 5 wherein one of said valve means operates in response to the movement of said piston toward said outlet to admit one of said components to the mixing chamber in response to the pressure maintained in one of said storage tanks.

7. Apparatus for mixing and dispensing multiple component mixtures comprising a mixing chamber having a plurality of inlets and an outlet, an injection cylinder inline with said chamber, a piston rod extending from said cylinder and having a piston on the free end thereof slidably disposed in said chamber, cam means attached to said rod, component supply means respectively interconnected with said chamber inlets, valve means for opening and closing said inlets, sprue valve means for opening and closing said outlet, and means mounted in the path of travel of said cam means and engageable by said cam means for sequentially operating said inlet valve means and said outlet valve means and said injection cylinder at preselected time intervals.

8. The invention according to claim 7 including means for varying the positions of the sequential operating means whereby to vary the time intervals in the sequence of operation and thereby vary the ratio of one component to another admitted to the chamber.

9. The invention according to claim 7 including means for varying the positions of the sequential operating means for varying the time intervals in the sequence of operation and thereby varying the volume of the components admitted to the chamber while maintaining a preselected ratio of one component to another.

10. Apparatus for mixing and dispensing multiple component mixtures comprising a mixing chamber having a volume variable in response to fluid entering the chamber and having at least one inlet and an outlet at one end thereof, mixing means disposed in said chamber adjacent said one end of the chamber, means for admitting a first component into said chamber in its low volume condition through another inlet, means for admitting a second component to the mixing chamber through said one inlet whereby to be immediately engaged by said mixing means and mixed with said first component, said chamber then being in a higher volume condition, and means for forcing the mixture formed by the mixing of said components through the mixing means and the outlet whereby said second component is subjected to mixing with said first component upon entering and upon leaving the mixing chamber.

11. Apparatus for mixing and dispensing multiple component mixtures comprising a mixing chamber having a volume variable in response to fluid entering the chamber and having a plurality of inlets and an outlet at one end thereof, mixing means disposed in said chamber adjacent said one end of the chamber, means for admitting a first component into said chamber through one of said inlets in the chamber low volume condition, means for admitting at least one other component to the mixing chamber through a second of said inlets to be immediately engaged by said mixing means and mixed with said first component, said chamber then being in a higher volume condition, and means for forcing the mixture formed by the mixing of said components through the mixing means and the outlet, whereby said components are subjected to the mixing means upon entering and upon leaving the mixing chamber.

12. Apparatus for mixing and dispensing polyurethane mixtures comprising a mixing chamber having a volume variable in response to fluid entering the chamber, means for admitting a charge comprising a measured volume of curable material into the mixing chamber in its low volume condition, means for admitting a measured volume of curing agent into the mixing chamber, said chamber then being in a higher volume condition, means disposed in said chamber for mixing the curable material and the curing agent, means for injecting the mixture into a mold assembly, and means responsive to the operation of said injecting means for admitting another charge of curable material only into the chamber immediately upon termination of the injection of mixture to provide chamber with sufficient curable material to prevent curing of the mix remaining in the chamber after the injection process, said last-mentioned charge of curable material serving further as the curable material component of the next mixture in the next cycle of operation.

13. Apparatus for mixing and dispensing polyurethane mixtures comprising a mixing chamber having a volume variable in response to fluid entering the chamber and having a plurality of inlets and an outlet, at least one of said inlets and said outlet being at one end of said chamber, mixing means disposed in said chamber adjacent said one end of the chamber, means for admitting a curable material into said chamber in its low volume condition through one of said inlets, means for admitting a curing agent to the mixing chamber through said one inlet in said one end of the chamber to be immediately engaged by said mixing means and mixed with said curable material, said chamber then being in a higher volume condition, and means for forcing the mixture formed by the mixing of the curable material and the curing agent through the mixing means and the outlet, whereby curing agent is mixed with said curable material upon entering said chamber and is mixed further with said curable material upon leaving said chamber.

14. Apparatus for mixing and dispensing multiple component mixtures comprising a mixing chamber, means for admitting a measured volume of one component into the mixing chamber, means for admitting a measured volume of at least one other component into the mixing chamber, means disposed in said chamber for mixing said components, nozzle means in said chamber for dispensing the mixed components from said chamber, injection means for forcing the mixture through said nozzle means, and means responsive to the operation of the injection means for lubricating the surface of said nozzle means, whereby to prevent adhesion of the mixture to said surface during the injection operation.

15. The invention according to claim 14 wherein said nozzle means includes a porous nozzle member through which lubricating oil passes to lubricate the surface of an opening through said member, said mixture passing through said opening during an injection operation.

16. Apparatus for mixing and dispensing multiple component mixtures comprising a mixing chamber, means for admitting a measured volume of one component into the mixing chamber, means for admitting a measured volume of at least one other component into the mixing chamber, means disposed in said chamber for mixing said components, nozzle means in said chamber for dispensing the mixed components from said chamber, injection means for forcing the mixture through said nozzle means, and means responsive to the operation of the injection means at the completion of an injecting operation for supplying gas under pressure to said nozzle member whereby to carry away from the surface of said member any residue of said mixture remaining on said surface.

17. The invention according to claim 16 wherein said nozzle means includes a porous nozzle member through which said pressurized gas passes to emerge from the surface of an opening through said member, said mixture having passed through said opening during the injection operation.

18. Apparatus for mixing and dispensing multiple component mixtures comprising a mixing chamber, mixer means disposed near one end of said chamber for mixing a plurality of components, outlet means located in said chamber at said one end of the chamber, a plurality of inlet means located at said end of the chamber, a piston disposed in said chamber in slidable engagement with the inside walls of said chamber, first valve means for admitting a charge of one component to said chamber through one of said inlets, at least one other valve means for admitting at least one other component to said chamber through a second of said inlets, said piston being slidably movable in said chamber in a direction away from said one end of the chamber responsive to the flow of the components into said chamber, and piston driving means connected to said piston for moving said piston toward said one end of the chamber whereby to force the mixed components through said mixer means and through said outlet means.

19. The invention according to claim 18 including means responsive to the movement of said piston toward said one end of the chamber for operating said first valve means for admitting another charge of said one component to the mixing chamber.

20. Apparatus for mixing and dispensing multiple component mixtures comprising a mixing chamber, a mixer disposed near one end of said chamber, injection means connected to a piston slidably disposed in said chamber, storage tanks for containing the respective components, mixing chamber inlets disposed at said one end of the mixing chamber, conduits interconnecting each storage tank with one of said inlets, valve means in each conduit for opening and closing the conduits, nozzle means at said end of the chamber comprising an outlet for the mixture, and sprue valve means for opening and closing said nozzle means, said valve means being operable to admit the components sequentially to the mixing chamber, the piston being movable in said chamber in a direction away from said one end of the chamber responsive to the admittance of said components, said injection means operable in response to said movement of the piston to change the direction of movement of said piston, and said sprue valve means being responsive to the first mentioned movement of the piston to open said sprue valve, whereby the movement of said piston toward said outlet and the open sprue valve cooperate to inject the mixture into a mold assembly.

References Cited

UNITED STATES PATENTS

| 2,788,953 | 4/1957 | Schneider | 222—134 |
| 3,236,416 | 2/1966 | Schnell et al. | 222—135 |

SAMUEL F. COLEMAN, *Primary Examiner.*

H. S. LANE, *Examiner.*